United States Patent Office 3,529,895
Patented Sept. 22, 1970

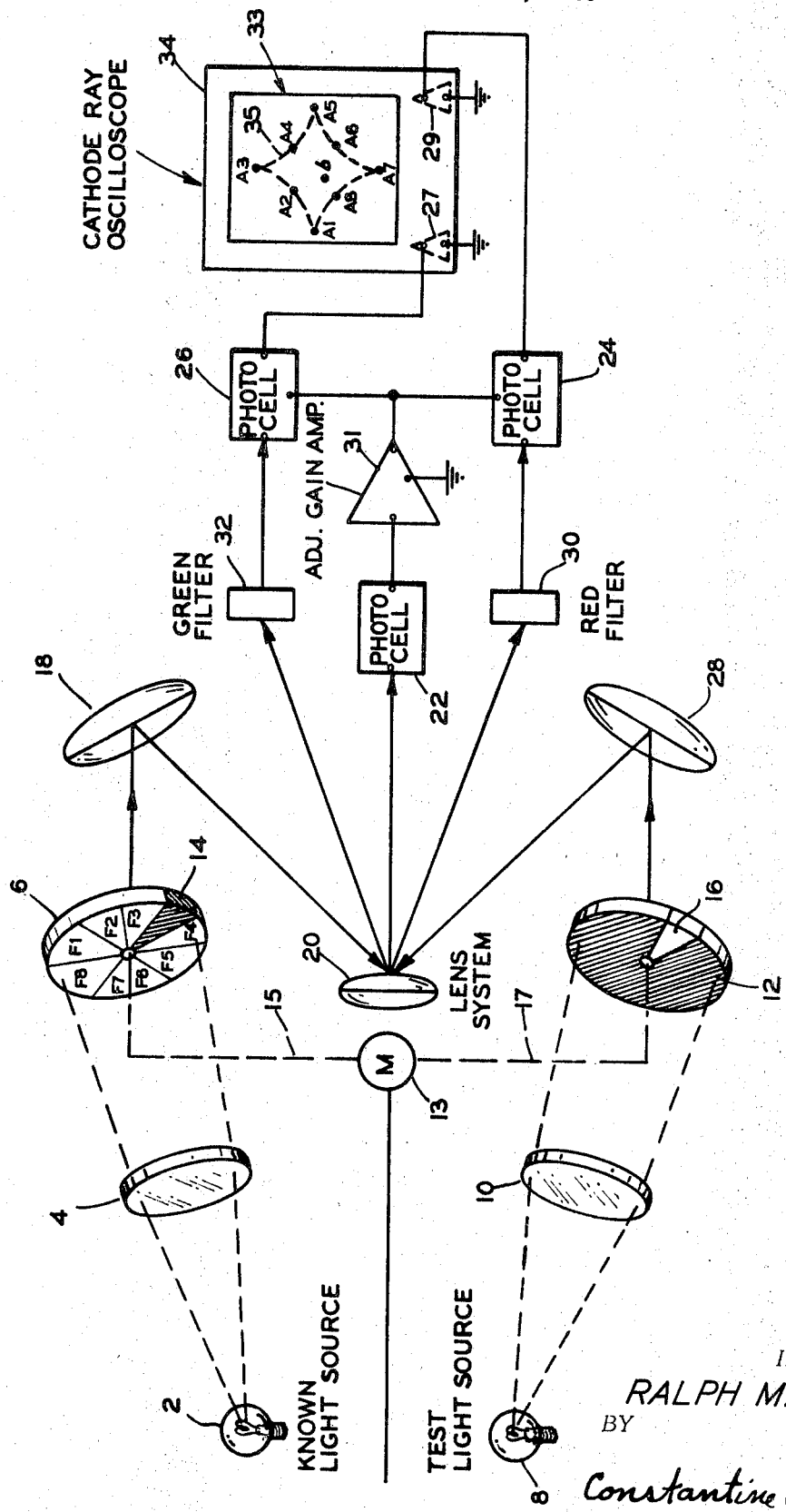

3,529,895
AUTOMATIC LIMIT COLORIMETER
Ralph M. Pincus, Fort Lee, N.J., assignor to The Bendix Corporation, a corporation of Delaware
Continuation-in-part of application Ser. No. 476,013, July 30, 1965. This application Feb. 24, 1969, Ser. No. 805,977
Int. Cl. G01j 1/10, 3/48; B07c 5/342
U.S. Cl. 356—179                              3 Claims

ABSTRACT OF THE DISCLOSURE

Apparatus for comparing colors of standard and sample lights. An image is displayed corresponding to the standard light and a point is displayed corresponding to the sample light. The relative positions of the image and the point provide the color comparison.

CROSS REFERENCE TO RELATED APPLICATIONS

This application is a continuation-in-part of U.S. application Ser. No. 476,013 filed July 30, 1965, by Ralph M. Pincus and assigned to The Bendix Corporation, assignee of the present invention.

BACKGROUND OF THE INVENTION

Field of the invention

This invention relates to colorimeters and, more particularly, to photoelectric colorimeters for making color comparisons.

Description of the prior art

It is often necessary to determine if the color of light is within predetermined limits. This is the case, for example, when an aircraft instrument panel must be lighted within specific limits to prevent pilot fatigue and provide maximum readability. In order to insure that the lighting is within specification, a comparison must be made with standard light which defines the specification limits. Prior to the present invention, apparatus for accomplishing this purpose required that the absolute values of the color components of the standard and sample lights be determined. This apparatus is unstable and nonrepetitive because it depends on the sensitivity of photosensors and which sensitivity is subject to variations due to temperature, aging and other conditions. Also, constant calibration is necessary because of the sensitivity of the measuring devices used.

SUMMARY OF THE INVENTION

The present invention contemplates a colorimeter including means for alternately transmitting standard and sample light of predetermined colors and for providing electrical signals corresponding to the transmitted light. An oscilloscope is responsive to the transmitted standard light signals for displaying an image defining the standard light and is responsive to the transmitted sample light for displaying a point defining the sample light. The relative positions of the image and point provide a color comparison of the standard and sample lights.

One object of this invention is to provide a photoelectric colorimeter having high accuracy.

Another object of this invention is to provide a color comparison of standard and sample lights.

Another object of this invention is to indicate whether or not the color of the sample light is within predetermined limits.

Another object of this invention is to provide a graphical representation of color limits of a standard light and to determine whether the color of sample light falls within these limits.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

DESCRIPTION OF THE DRAWING

The single figure is a diagrammatic view of a photoelectric colorimeter according to the invention.

DESCRIPTION OF THE INVENTION

In reference to the figure, light from a known or standard light source 2 is directed through a lens 4 and a filter wheel 6 having filters F1 to F8 which are chosen to have a spectral response such that, when utilized with standard light source 2, yield an acceptable color range for an aircraft instrument panel. Filter wheel 6 has an opaque portion 14 for the reason mentioned hereinafter. Light transmitted by filter wheel 6 is directed to a lens system 20 by a reflecting mirror 18.

Light from a test or sample light source 8 is used to light an aircraft instrument panel and the color thereof is compared to the color of light from standard light source 2. Light from sample light source 8 is directed through a lens 10 to a wheel 12 which is opaque except for a translucent portion 16. Filter wheel 6 and wheel 12 are synchronously rotated about their axes by suitable electromechanical means, such as a motor 13, through suitable linkages 15 and 17, respectively, so that as opaque portion 14 of filter wheel 6 blocks light from standard light source 2, translucent portion 16 of wheel 12 passes light from sample light source 8. Light transmitted by wheel 12 is directed to lens system 20 by a reflecting mirror 28.

Light from lens system 20 is directed to a red light filter 30 and to a green light filter 32, and which filters 30 and 32 transmit red and green light to photocells 24 and 26, respectively. Photocell 24 is responsive to the transmitted red light for providing corresponding electrical signals and photocell 26 is responsive to the transmitted green light for providing corresponding electrical signals. The signals from photocells 24 and 26 control horizontal and vertical amplifiers 27 and 29, respectively, of a cathode-ray oscilloscope 34.

A photosensor 22 senses unfiltered light and adjusts an adjustable gain amplifier 31 as a function thereof to control the gain of photosensors 24 and 26 so that the photosensors are independent of the brightness of light from sources 2 and 8. Adjustable gain amplifier 31, may be of a type such as that described in Section III, pp. 155–158, Basic Theory and Application of Transistors, TM 11–690, Dept. of the Army, March 1959. The sensitivity of cathode-ray oscilloscope 34 may be increased by appropriate adjustment of horizontal amplifier 27 and vertical amplifier 29.

Thus, as filter wheel 6 rotates, photocells 24 and 26 provide signals which control amplifiers 27 and 29 so that an image 35 is provided on a screen 33 of cathode-ray oscilloscope 34. Image 35, consisting of points A1 to A8, is a graphical representation of the color limits defined by known light source 2 and filters F1 to F8.

When light from standard light source 2 is blocked by opaque portion 14 of filter wheel 6 and light from sample light source 8 is transmitted through translucent portion 16 of opaque wheel 12, the transmitted light is filtered by filters 30 and 32 and directed to photosensors 24 and 26, respectively, to provide signals producing a point b on screen 33 of oscilloscope 34. The position of point b, representing the color of test light source 8 is compared to the limits defined by points A1 to A8 to determine if the color of test light source 8 is within the limits so provided.

In order for an adequate comparison to be made, the screen persistence of cathode-ray oscilloscope screen 33 should be high; that is, the length of time that screen 33 flouresces, at the points where signals from photocells 24 and 26 impinge upon it, should be relatively long. The screen persistence depends on the fluorescent material used, and a material should be chosen which will cause points A1 to A8 and $b$ to linger so that an adequate comparison may be made.

OPERATION

The operation of the device constructed in accordance with the present invention is such that light from standard light source 2 is filtered by filters F1 to F8 to define the limits of light from sample light source 8. The filtered light energizes photocells 24 and 26 which control horizontal and vertical amplifiers 27 and 29, respectively, of cathode-ray oscilloscope 34 to provide image 35 on oscilloscope screen 33. Image 35 is thus made up of a series of points, with each point corresponding to a component color of the light from known light source 2.

At a predetermined interval, when light from known light source 2 is blocked by opaque portion 14 of filter wheel 6, light from test light source 8 passes through translucent portion 16 of otherwise opaque wheel 12. This light is directed through filters 30 and 32 and photocells 24 and 26 to provide point image $b$ on oscilloscope screen 33. When point $b$ is positioned within the limits of image 35, light from test light source 8 is within the limits degned by the light from standard light source 2 and filters F1 to F8. A suitable go/no-go indicator is thus provided for comparing any sample light to standard light from source 2.

The present invention provides a simplified qualitative comparison of the color of a sample light source with that of a standard light source and uses standard optical components and electronic equipment. For these reasons the device should find wide usage in various applications where color sources must be compared and evaluated.

Although but a single embodiment of the invention has been illustrated and described in detail, it is to be expressly understood that the invention is not limited thereto. For example, the described device may be used to compare any two colors without regard to whether the characteristics of one of these colors is known. Various changes may also be made in the design and arrangement of the parts without departing from the spirit and scope of the invention as the same will now be understood by those skilled in the art.

What is claimed is:

1. A device for comparing the color of a sample light to the color of a standard light, comprising:
    a source of a standard light beam;
    a source of a sample light beam;
    a rotatably mounted first filter means positioned in said standard beam and having a plurality of individual filter portions for sequentially transmitting a corresponding plurality of predetermined spectral portions of said beam and an opaque portion for periodically blocking passage of said beam;
    rotating means for rotating the filter means so that the individual filter portions sequentially transmit predetermined spectral portions of said light beam and the opaque portion periodically blocks said light beam;
    a rotatably mounted disc means having an opaque portion corresponding to the individual filter portions of the first filter means and a light transmitting portion corresponding to the opaque portion of the filter; said disc being connected to the rotating means and rotated thereby synchronously with the filter so that when the filter means transmits predetermined spectral portions of said standard light beam the disc blocks the sample light beam, and when the filter means blocks the standard light beam the disc transmits the sample light beam;
    lens system means positioned in the paths of the beams transmitted by said first filter means and said disc means for directing each of these transmitted beams through second and third filter means onto first and second photoelectric detectors, said second and third filter means each transmitting a predetermined spectral portion of the beams directed to it by the lens system means;
    said photodetectors each generating an electrical signal proportional to the intensity of the beam incident upon it; and
    display means comprising a cathode ray oscilloscope, for presenting for comparison purposes, the output signals from the first and second photodetectors as a plurality of points corresponding to the plurality of predetermined spectral portions of the standard light beam, and as a single point corresponding to the predetermined portion of the sample light beam.

2. A device as described by claim 1, wherein the lens system means comprises:
    a first reflecting mirror disposed ahead of the filter for reflecting light transmitted thereby;
    a second reflecting mirror disposed ahead of the disc for reflecting light transmitted thereby; and
    a lens system disposed intermediate the first and second reflecting mirrors to direct the reflected light for interception by the first and second selection means.

3. A device as described by claim 2, further comprising:
    third photo-electric means disposed ahead of the lens system for sensing light other than that directed to the first and second selection means, and for providing a corresponding electrical signal;
    an adjustable gain amplifier connected to the third photo-electric means for providing a gain adjusted output in response to the signal therefrom; and
    the first and second photo-electric means being connected to the amplifier and controlled by the gain adjusted output therefrom to be independent of the brightness of light from the standard and sample light sources.

References Cited

UNITED STATES PATENTS

| | | | |
|---|---|---|---|
| 1,898,219 | 2/1933 | Sharp | 356—188 |
| 2,483,452 | 10/1949 | Berkley | 356—176 |
| 2,625,265 | 1/1953 | Cox | 209—111 |
| 2,992,588 | 7/1961 | Henderson | 356—236 X |
| 3,133,201 | 5/1964 | Rock | 356—177 |
| 3,336,833 | 8/1967 | Villers | 356—188 |
| 3,363,108 | 1/1968 | Spurr et al. | 356—188 |

FOREIGN PATENTS 1,133,570   7/1962   Germany.

OTHER REFERENCES

Lewis: "Colorede: Color Measurement for Continuous Textile Dyeing," Am. Diestuff Rprtr., July 20, 1964, pp. 30–35.

ROY LAKE, Primary Examiner

R. J. WEBSTER, Assistant Examiner

U.S. Cl. X.R.

209—111.6; 250—226; 356—188, 195, 230